United States Patent [19]
Ji et al.

[11] Patent Number: 6,028,776
[45] Date of Patent: Feb. 22, 2000

[54] POWER FACTOR CORRECTION CONVERTER

[75] Inventors: Ho Kyun Ji; Kyu Chan Lee, both of Seoul; Bo Hyung Cho, Suwon, all of Rep. of Korea

[73] Assignee: Samsung Electro-Mechanics Co. Ltd., Suwon, Rep. of Korea

[21] Appl. No.: 08/976,545

[22] Filed: Nov. 24, 1997

[30] Foreign Application Priority Data

Jul. 31, 1997 [KR] Rep. of Korea ............... 97-36454

[51] Int. Cl.⁷ .................................................. H02M 3/335
[52] U.S. Cl. ................................................................. 363/21
[58] Field of Search ................................ 363/15, 16, 20, 363/21, 95, 97, 131

[56] References Cited

U.S. PATENT DOCUMENTS

| | | | |
|---|---|---|---|
| 4,866,589 | 9/1989 | Satoo et al. | 363/21 |
| 5,412,556 | 5/1995 | Marinus | 363/21 |
| 5,440,473 | 8/1995 | Ishii et al. | 363/21 |
| 5,448,466 | 9/1995 | Erckert | 363/16 |
| 5,748,461 | 5/1998 | Preller | 363/97 |

*Primary Examiner*—Matthew Nguyen
*Attorney, Agent, or Firm*—Ladas & Parry

[57] ABSTRACT

A PFC converter includes a bridge diode, a booster section controlled for improving a power factor of the bridge diode, a transformer section supplied with an output of the booster section via a primary coil side to excite it to a secondary coil side, a switch section for switching the output of the booster section, an output section for rectifying and smoothing the output of secondary coil side of the transformer section, a control section for sensing to feedback an output voltage of the output section and thus control the switch section, and a delay section operated for applying a stable voltage to the transformer section by controlling the booster section according to the output of the control section, so that the booster section is controlled for decreasing the harmonic current by the delayed output of the delay section to constantly maintain the voltage of a bulk condenser and thereby improve the power factor while controlling double stage PFC converter and DC—DC converter by the single phase.

3 Claims, 6 Drawing Sheets

POWER FACTOR CORRECTION CONVERTER

BACKGROUND OF THE INVENTION

1. Field of the Invention

The present invention relates to power factor correction (hereinafter simply referred to as "PFC" converter, and more particularly to a PFC converter provided with a booster control circuit controlled for decreasing harmonic current for constantly maintaining a range of a stable voltage of a bulk condenser to improve a power factor.

2. Description of the Prior Art

Generally, a voltage flowing through an electric transmission line is formed by periodic waveforms. Also, in respective components of the periodic waveform, harmonic current being a harmonic noise which is to be n-harmonic wave having a frequency of n times of a fundamental wave exists as well as the fundamental wave. However, recently in respective countries, when a voltage is supplied onto the electric transmission lines, the voltage is transmitted after being boosted for lowering a transmission loss. For this operation, a coil is provided to the preceding stage of a bulk condenser being the primary side of the input terminal of a transformer which forms an electric power supplying apparatus to prevent the supply of an overvoltage to the bulk condenser, or a boost-up circuit is provided to switch for chopping the voltage transmitted to be applied into the electric power supplying apparatus. By this construction, the harmonic current is lowered at the voltage supplied into the electric power supplying apparatus to enhance the power factor.

FIG. 1 is a circuit diagram showing a smoothing converter according to a conventional technique.

The conventional smoothing converter is formed by a bridge diode 10 for rectifying an input voltage Vi, and a smoothing section 12 for lowering a harmonic current in an output voltage of bridge diode 10 to improve the power factor. Also, a transformer T excites the output of smoothing section 12 from the primary coil side toward the second coil side by the switching of a switch section Q which is switched for allowing the output of smoothing section 12 to be pulsewidth-modulated under the control of a control section 16. An output section 14 rectifies and smooths the secondary side output of transformer T, and control section 16 controls switch section Q by the feedback of an output voltage Vo of output section 14.

In the smoothing converter according to the conventional technique formed as above, when input voltage Vi is applied to be higher than the potential of first and second condensers C1 and C2 connected to a second diode D2 of smoothing section 12, it charges up first condenser C1 by the forward supply of second condenser C2 and second diode D2. If input voltage Vi is applied to be lower than the potential of first and second condensers C1 and C2, the voltage charging up first and second condensers C1 and C2 is applied to transformer T by the operation of switch section Q which switches in accordance with the control of control section 16 via a closed circuit formed by first diode D1 serially connected to first condenser C1 and a third diode D3 serially connected to second condenser C2.

When the current charges up first and second condensers C1 and C2 of smoothing section 12 by input voltage Vi, input voltage Vi charges up first and second condensers C1 and C2 which are serially connected by input voltage Vi as in the case of applying input voltage Vi to be higher than the charging voltage of first and second condensers C1 and C2 connected by second diode D2. At this time, since the capacitance is reduced due to serially-connected first and second condensers C1 and C2, the charging current charging up first and second condensers C1 and C2 by input voltage Vi has a wide conduction angle to reduce the harmonic current. For this reason, the power factor of the converter which is the electric power supplying apparatus is improved.

However, the smoothing converter according to the conventional technique is charged by applying the high voltage to the first and second condensers which are the bulk condenser employed to the input stage. Consequently, the high voltage is applied to the switch to necessarily require a switch which can sustain the high voltage. Otherwise, a frequency modulating function may be applied to the switch for decreasing the voltage applied to the condenser, which, however, involves a problem of lowering the power factor of the converter because an operating frequency is changed within a wide range. Furthermore, although the foregoing smoothing converter is of the low-priced system, it has a problem that its power factor is not significantly improved to be enough to satisfy the class D standard of IEC-1000-3-2 which is the international standard with respect to the harmonic current.

FIG. 2A is a circuit diagram showing a two stage PFC converter according to the conventional technique, and FIG. 2B is a circuit diagram showing a single phase PFC converter according to the conventional technique.

The two PFC converter circuit according to the conventional technique includes a bridge diode 20 for rectifying an input voltage Vi, and a booster section 22 which is the PFC for switching a second switch section Q2 to improve the power factor of the output of bridge diode 20. Additionally, a driving section 22a senses a voltage applied to a bulk condenser C to switch second switch section Q2 of booster section 22. A transformer T excites the output of booster section 22 from the primary coil side to the secondary coil side, and a switch section Q is switched for pulsewidth-modulating the output of booster section 22 by the control of control section 26. Also, an output section 24 rectifies and smooths the output of the secondary side of transformer T, and control section 26 controls switch section Q by the feedback of an output voltage Vo of output section 24.

The two stage PFC converter circuit according to the conventional technique constructed as above is separately equipped with booster section 22 which is a converter for improving the power factor at the preceding stage of a DC—DC converter for controlling the output voltage. Here, the two stage PFC converter circuit is operated by the two stage of booster section 22 and DC—DC converter such that second switch section Q2 of booster section 22 is switched by means of driving section 22a which is operated separately from control section 26 for making the voltage applied to bulk condenser C constant to the variation of input voltage Vi in the input stage of the converter. By this operation, the harmonic current is decreased in the current supplied to coil L of booster section 22 to improve the power factor.

In more detail, input voltage Vi is rectified in bridge diode 20, and second switch section Q2 is switched to improve the power factor of the rectified output voltage of bridge rectifier 20 in such a manner that the voltage applied to bulk condenser C and that applied to coil L are sensed and compared by driving section 22a which is the PFC control section to apply a stable voltage to bulk condenser C.

The output from switched booster section 22 is to supply the voltage with decreased harmonic current to bulk condenser C, and the voltage charging up bulk condenser C is switched to pulsewidth-modulate switch section Q by the control of control section 26 to be excited from the primary coil side to secondary coil side of transformer T. Then, it is rectified and smoothed in output section 24 to be generated as output voltage Vo.

Also, for securing the stable output of output voltage Vo, output voltage Vo of output section 24 is feedback for switching switch section Q under the control of control section 26 to be controlled.

Booster section 22 is operated to decrease the harmonic wave in input voltage Vi applied from the DC input via coil L since input voltage Vi is switched by second switch section Q2 which becomes an active element being a transistor by driving section 22a to sense the voltage applied to bulk condenser C.

The converter of PFC system further furnished with booster section 22 for improving the power factor by effectively decreasing the harmonic wave as described above utilizes a specified controlling IC to be independently controlled to highly improve the power factor. In addition, the input power source of 110 volts and 220 volts can be utilized without shifting the input power source to be used for a wide input power source.

However, the two stage PFC system independently controlled for improving the power factor separately requires the IC especially for the PFC to complicate the circuit and increase the manufacturing cost.

Referring to FIG. 20 the single stage PFC converter circuit according to the conventional technique is formed by a bridge diode 20 for rectifying an input voltage Vi, and a power factor improving section 23 formed of a coil L, a diode D and a bulk condenser C for improving the power factor of the output of bridge diode 20. A transformer T excites the output of power factor improving section 23 from the primary coil side to the secondary coil side being the output part, and a switch section Q switches the voltage applied to transformer T. Also, an output section 24 rectifies and smooths the secondary side output of transformer T, and a control section 26 to controls switch section Q by sensing to feedback output voltage Vo of output section 24.

The single stage PFC converter circuit according to the conventional technique formed as above has the system of integrating the power factor improving converter and DC—DC converter by a system differently from the double stage PFC converter circuit as shown in FIG. 2A which is separately furnished with booster section 22 being the converter for improving the power factor at the preceding stage of the DC—DC converter for controlling the output voltage.

In other words, the harmonic current of input voltage Vi having passed through bridge diode 20 becomes decreased at coil L, and output of coil L with the decreased harmonic current is supplied to bulk condenser C and switch section Q via respective diodes D, thereby improving the power factor.

Consequently, in the single stage PFC converter circuit according to the conventional technique operated as above, the power factor improving control IC is deleted so as to simultaneously perform the power factor improvement and output voltage control by means the single converter. Furthermore, the number of parts newly added for the power factor improvement is small to allow for realizing the small size and incurring low price.

The harmonic current can be decreased in the single stage PFC converter formed in the low-priced system. But, in the actual application, the great current is supplied to the single switch provided to the preceding stage of the transformer since the booster current and DC—DC converter current operated in the disc continuous conduction mode (DCM) are simultaneously transmitted. For this reason, when the converter is operated at 100 W or higher, at least two switches should be employed to minimize the influence caused by the great current. As the result, in the converter operated at 100 W or higher, the construction consisting of the single stage control and single switch has a problem that the capacitance of the bulk condenser is set to a predetermined value to make the voltage charging up the condenser irregular in conformity with the load variation and input voltage variation, so that the voltage applied to the transformer section becomes unstable to decrease the power factor of the converter.

SUMMARY OF THE INVENTION

Therefore, it is an object of the present invention to provide a PFC converter, wherein, in order to solve the foregoing problems of the prior art, a delay circuit is formed for constantly maintaining a range of a voltage of a bulk condenser to decrease harmonic current.

To achieve the above object of the present invention, a PFC converter includes a bridge diode section for rectifying an input voltage, a booster section for switching an output of the bridge diode section for generating a constant output voltage, and a transformer section supplied with an output of the booster section via a primary coil side to excite it to a secondary coil side. Also provided parts are a switch section for switching the output of the booster section supplied to the primary coil side of the transformer section, and an output section for rectifying and smoothing the output of secondary coil side of the transformer section. In addition to these parts, a control section senses an output voltage of the output section and performs the feedback operation of a sensing signal to the switch section to control an output of the output section, and a booster control section is operated for delaying an output of the control section for a predetermined time to control the switching of the booster section in accordance with the delayed output signal to thus constantly maintain a range of a stable output voltage of the booster section to improve a power factor.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

The PFC converter according to the present invention is formed by a bridge diode section 30 for rectifying an input voltage Vi, and a booster section 32 operated for switching an output of bridge diode section 30 to generate a stable output voltage and thereby improve a power factor. A transformer section T is supplied with an output of booster section 32 via its primary coil side to excite it to the secondary coil side, and a switch section S switches the output of booster section 32 supplied to the primary coil side of transformer section T. Also provided as parts of the PFC converter are an output section 34 for rectifying and smoothing the secondary side output of transformer section T, and a control section 36 for sensing an output voltage Vo of output section 34 to feedback a sensing signal to switch section S and then control the output of output section 34. Additionally, a booster control section for being controlled to decrease a switching duty thereof when a load magnitude thereof increases in accordance with a output signal of the control section and being controlled to increase the switching duty thereof when the load magnitude thereof decreases in accordance therewith.

Control section 36 includes a shunt regulator SR, a light emitting diode PC1 which is a photo coupler operated by the control of shunt regulator SR, and a light-receiving transistor PC2 for receiving the light emitted from light emitting diode PC1. In addition, an OP amplifier OP1 has an inverting input terminal−connected with an output of light-receiving transistor PC2 of the photo coupler and non-inverting input terminal+connected with a reference voltage Vref for amplifying an input signal, and a comparator OP2 has a non-inverting input terminal+connected to an output of the OP amplifier OP1 and an inverting input terminal− supplied with a sawtooth wave for amplifying the input signal.

Figure 1:
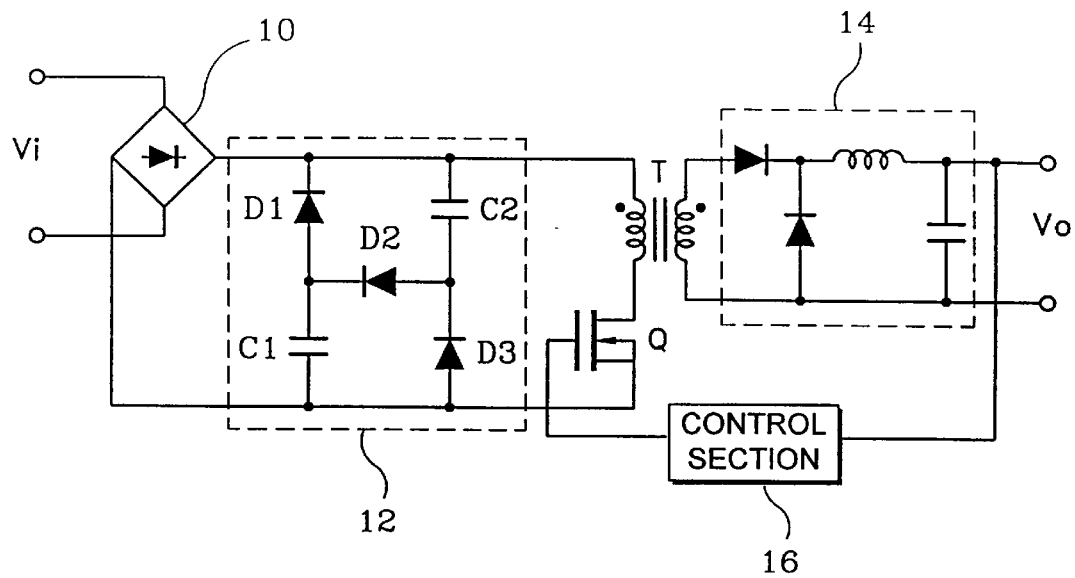
FIG. 1 is a circuit diagram of a smoothing converter according to a conventional technique.
Figure 2A:
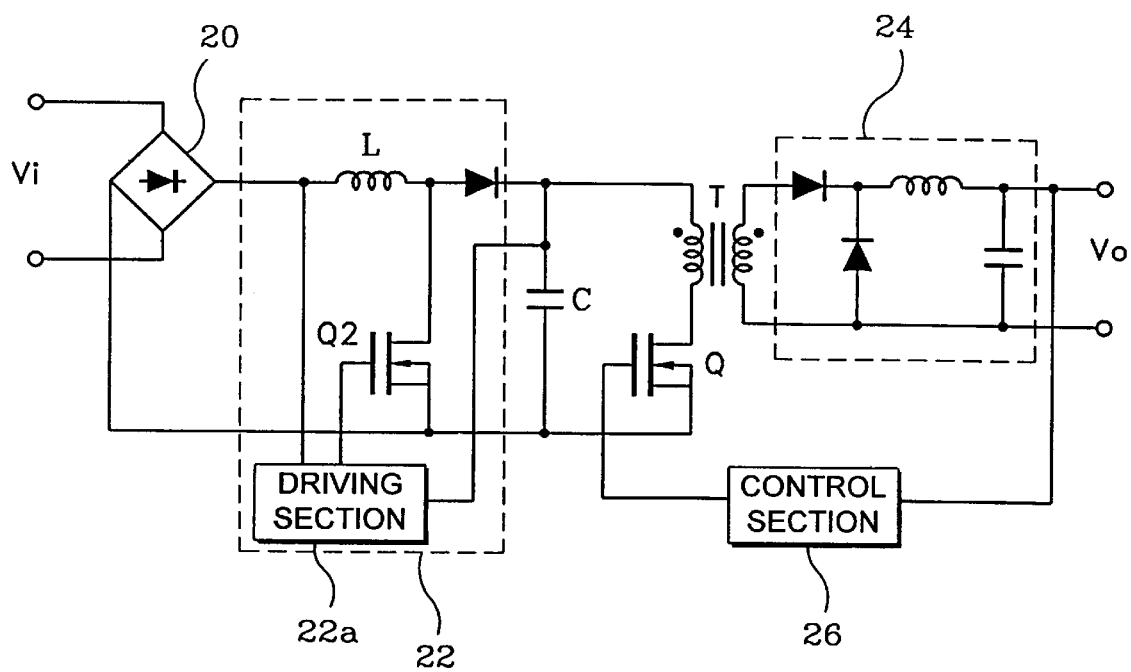
FIG. 2A is a circuit diagram of a two stage PFC converter according to a conventional technique.
Figure 2B:
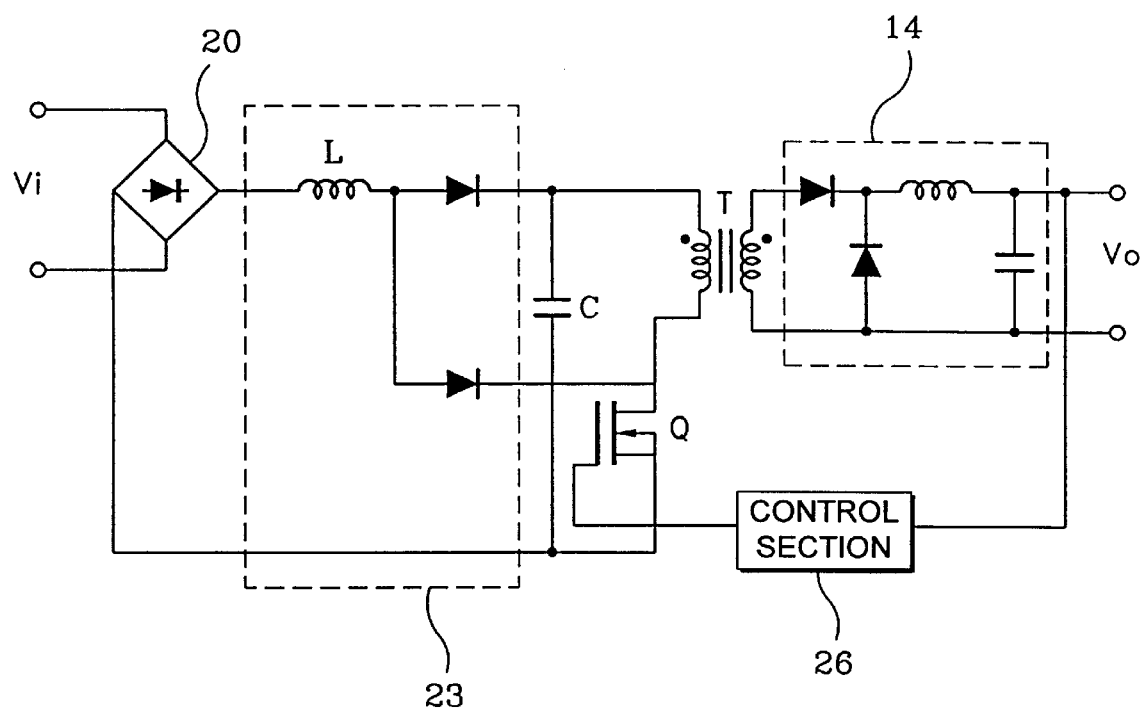
FIG. 2B is a circuit diagram of a single stage PFC converter according to a conventional technique.
Figure 3:
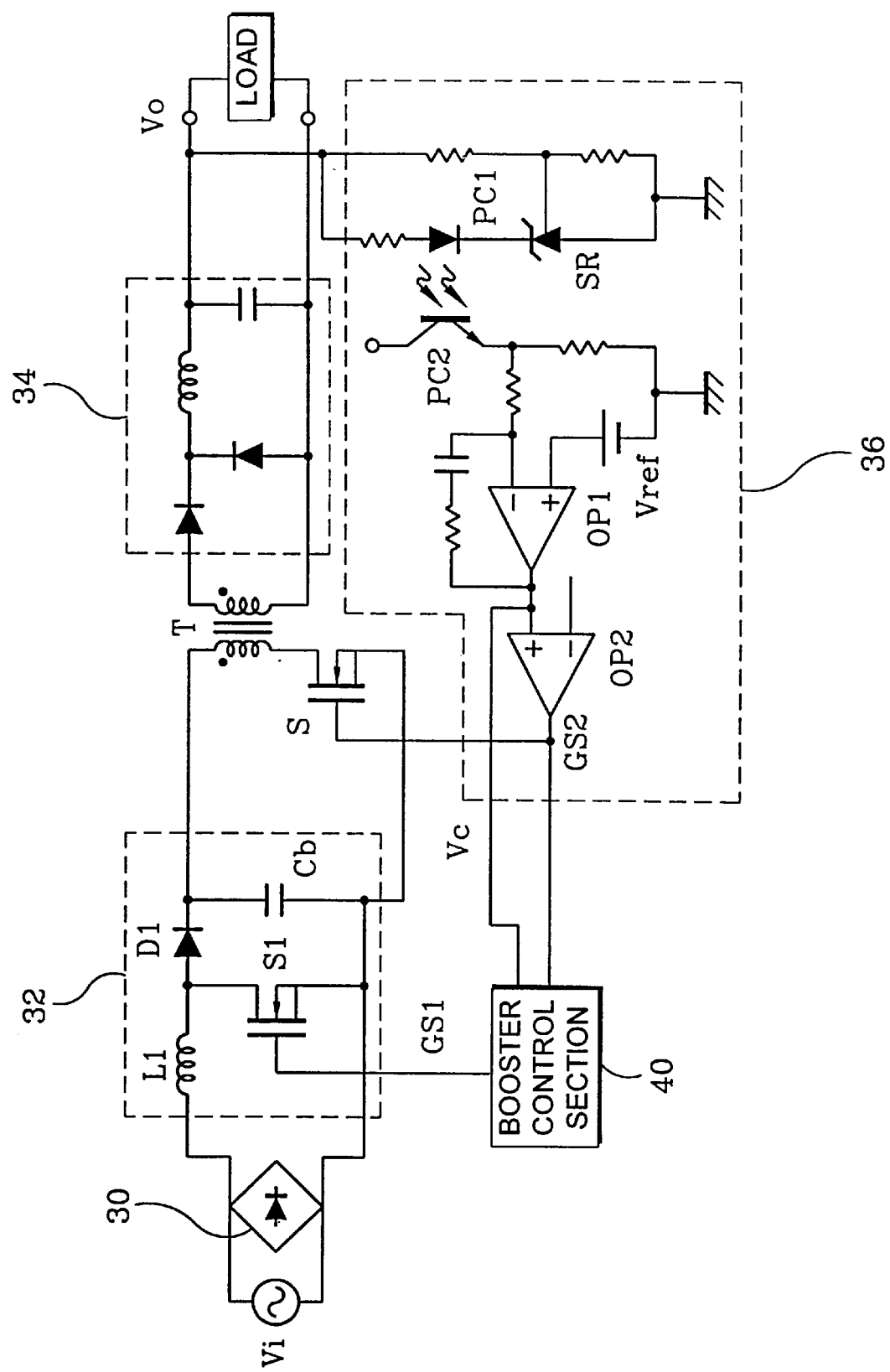
FIG. 3 is a circuit diagram of a PFC converter according to the present invention.
Figure 4:
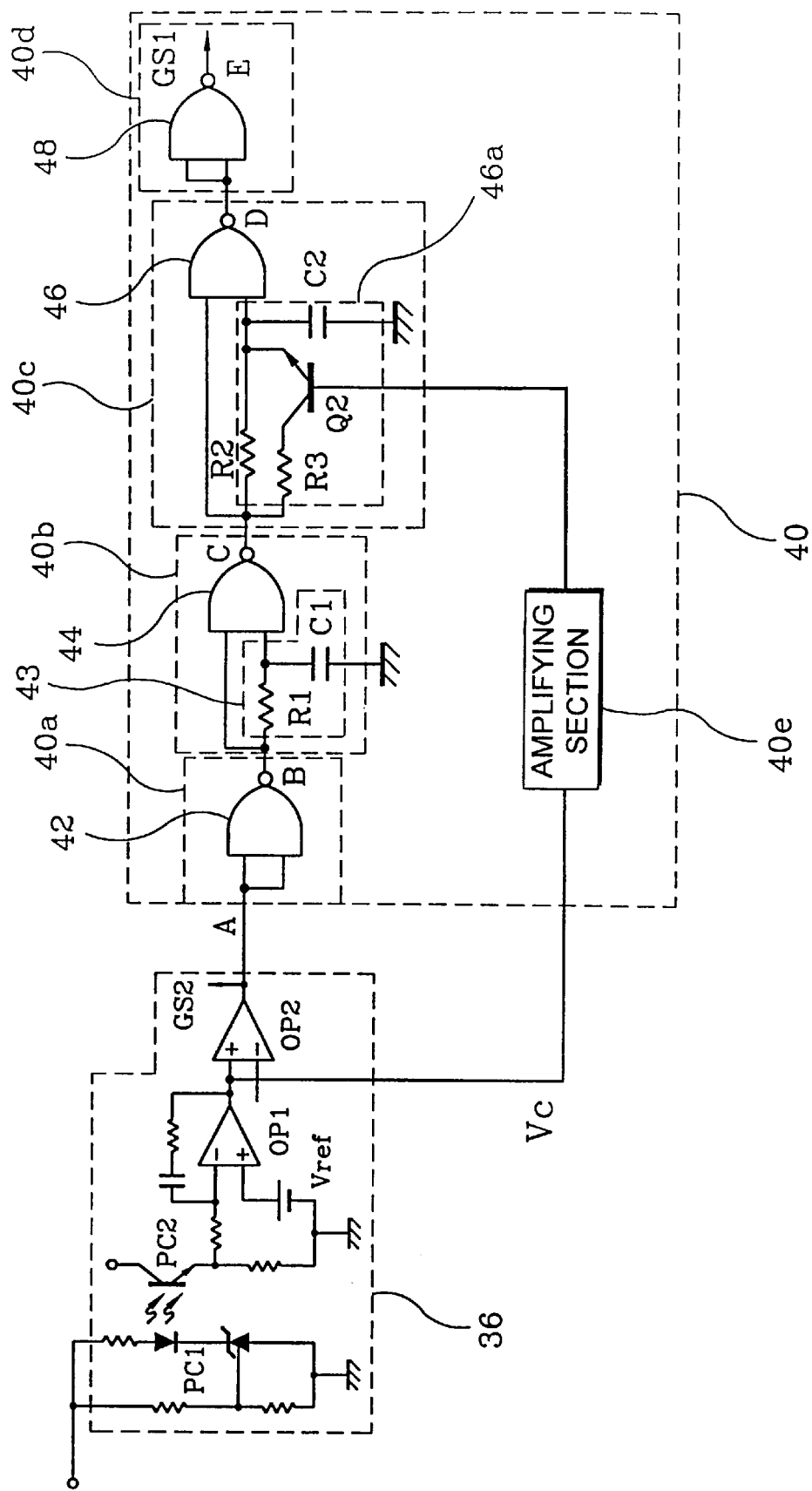
FIG. 4 is a circuit diagram of the booster control section shown in FIG. 3.

As shown in FIG. 4, the booster section 40 is formed by a first buffer section 40a consisting of a first NAND gate 42 being a NAND Gate for inverting an output of the comparator OP2 of the control section 36, a second buffer section 40b including a fixed delay section 43 for delaying an output signal of the first buffer section 40a by a preset time period, and a second NAND gate 44 for NANDing the output signal of the fixed delay section 43 and the output signal of the first buffer section 40a and inverting the resultant value, an amplifying section 40e for amplifying an output value of an OP amplifier OP1 of the control section 36; and a third buffer section 40c including a second delay section 46a for variably delaying the output signal of the second buffer section 40b in accordance with the output signal of the amplifying section 40e, and a third gate 46 for NANDing the output signal of the variable delay section 46a and the output pulse of the second buffer section 46 and inverting the resultant value; a fourth buffer section 40d consists of a fourth NAND gate 48 being the NAND gate for inverting an output of third buffer section 40c.

The fixed delay section 43 includes a first resistance R1 connected between an output terminal of the second buffer section 40b and an input terminal of the second NAND gate 44, and a first condenser C1 having an end thereof connected to a command node of the first resistance R1 and the second NAND gate 44 and another end thereof connected to ground. The variable delay section 46a includes a second resistance R2 connected between an output terminal of the second NAND gate 44 and an input terminal of the third NAND gate 46, a third resistance R3 having an end thereof connected to a common node of the output terminal of the second NAND gate 44 and the second resistance R2, a second switching device Q2 having a collector thereof connected to another end of the third resistance R3, a base thereof connected to an output terminal of the amplifying section 40e, and an emitter thereof connected to a common node of the second resistance R2 and second switching device Q2, and a second condenser C2 having an end thereof connected to a common node of the emitter of the second switching device Q2 and the third NAND gate 46, and another end thereof connected to ground. The second switching device Q2 includes a PNP-type bipolar transistor which is controlled in accordance with an output signal of the amplifying section 40e.

Booster section 32 includes a coil L1 serially connected to the output of bridge diode section 30, and a first switching device S1 being an N-channel field effect transistor which is connected in parallel with coil L1 and controlled by delay section 40. In addition, a diode D1 has an anode serially connected to coil L1, and a bulk condenser Cb is connected in parallel with the cathode of diode D1.

The PFC converter according to the present invention is provided with booster section 32 which is the PFC converter as a preregulator for providing the stable voltage, and the DC—DC converter at the succeeding stage of booster section 32 for converting the DC to DC, thereby constituting the two stage PFC converter.

The operational state of the PFC converter formed as above will be described below.

Generally, the range of improving the power factor of the converter which is the electric power supplying apparatus is determined by the mutual relation of input voltage Vi and bulk condenser Cb. That is, input voltage Vi charges up bulk condenser Cb after having the decreased harmonic current by the switching of first switching device S1 of booster section 32. By doing so, the stable voltage of bulk condenser Cb is supplied to switch section S provided to the preceding stage of transformer section T to improve the power factor.

Figure 6A:
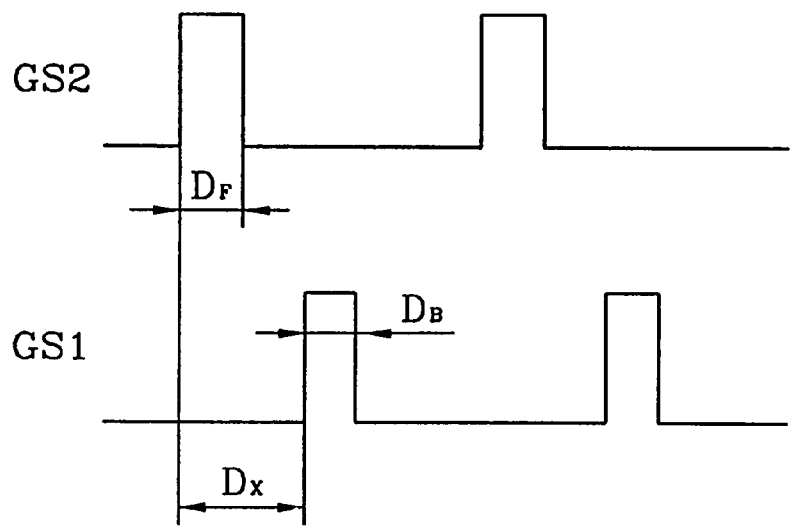
FIG. 6A shows waveforms showing the maximum input voltage and minimum load state.
Figure 6B:
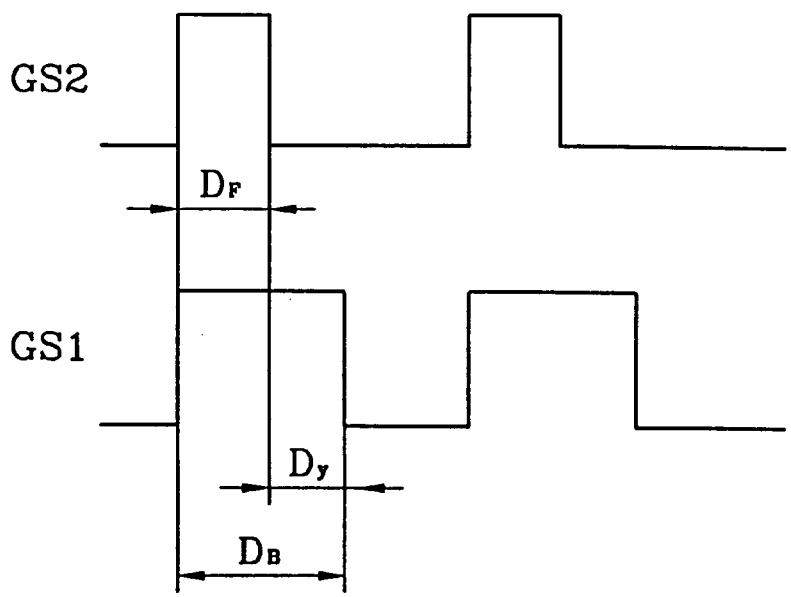
FIG. 6B shows waveforms showing the minimum input voltage and maximum load state.

FIG. 6A shows waveforms of the maximum input voltage and minimum load state, and FIG. 6B shows waveforms of the minimum input voltage and maximum load state.

As shown in FIG. 6A, since a case that the voltage loaded upon bulk condenser Cb of booster section 32 becomes maximum is of the maximum input voltage and minimum load, first switching device S1 of booster section 32 is controlled to be turned on by a predetermined delay time Dx by delay section 40 for decreasing the voltage applied to bulk condenser Cb when first switching device S1 of booster section 32 is switched.

Furthermore, the signals supplied into booster control section 40 are output signal GS2 of second comparator OP2 of control section 36 being the input signal of first NAND gate 42 of first buffer section 40a and output signal Vc of OP amplifier OP1 connected to non-inverting input terminal+of second comparator OP2, and are delayed in booster control section 40 to be inversely proportion to the increase/decrease of output voltage Vo, thereby being provided as delayed output signal GS1.

First, in a minimum load state, as a voltage applied to bulk condenser Cb is increased, an output voltage Vo provided from output section 34 is increased. Therefore, a voltage of inverting input terminal−of OP amplifier OP1 of control section 36 of which non-inverting input terminal+is connected with reference voltage Vref becomes larger than reference voltage Vref, so that output Vc of OP amplifier OP1 is decreased.

And then, once the output Vc of OP amplifier OP1 is decreased, a output of comparator OP2 applied to non-inverting input terminal+supplied with output Vc is provided as pulse in accordance with the sawtooth wave supplied to inverting input terminal−, and of a rising time (that is, high pulsewidth) pulsewidth of signal GS2 from the comparator OP2 is increased due to decreased the output Vc to control the switch section S. For this reason, as shown in FIG. 6A, a signal supplied to the gate for turning on first switching device S1 is delayed by booster control section 40 to turn on first switching device S1 after elapsing predetermined delay time Dx. Following to this, a voltage applied to bulk condenser Cb is decreased, and the increased voltage applied to bulk condenser Cb is decreased.

Figure 5:
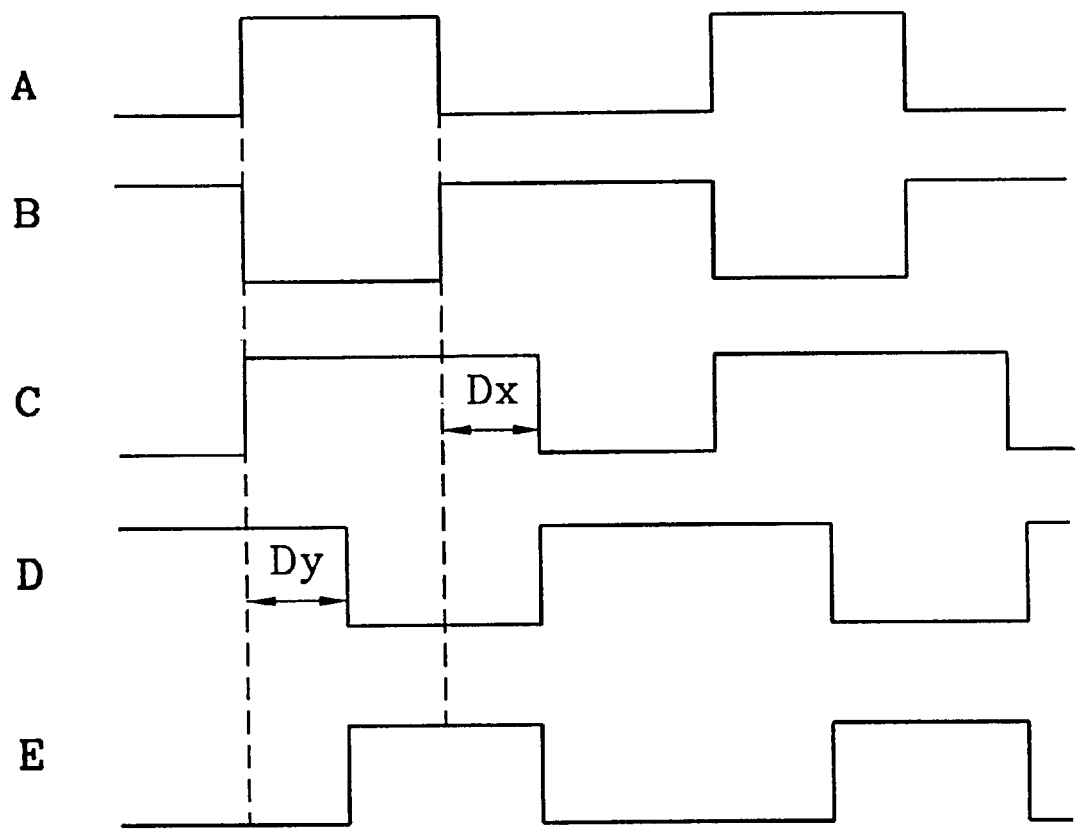
FIG. 5 shows waveforms of respective sections of FIG. 4.

Referring to FIG. 5, the output GS2 of control section 36 as shown in FIG. 5A is supplied to first NAND gate 42 being the buffer, and the inverted output as shown in FIG. 5B of first NAND gate 42 is supplied into second NAND gate 44 while being delayed by first resistor R1 and first condenser C1 connected in parallel with first resistor R1. Therefore, the output of second NAND gate 44 is provided by being delayed for predetermined delay time Dx as shown in FIG. 5C.

On the other hand, the output Vc of OP amplifier OP1 of control section 36 is amplified by amplifier OP3 of amplifying section 40e to be supplied to the base of second switching device Q2 which is the PNP-type bipolar transistor. By doing so, the resistor circuit consisting of second resistor R2, third resistor R3 and the transistor Q2 is formed. Thus, the varying resistor circuit has a varying resistance in accordance with output signal of the amplifying section 40e applied to the base of the second switching device Q2.

Consequently, by the action of second switching device Q2 interrelated to the output of OP amplifier OP1 via amplifier OP3, the delayed range of the output signal of second NAND gate 44 is varied in accordance with the operation of delay circuit 46a formed by second resistor R2, third resistor R3, second switching device Q2 and second condenser C2.

More specifically, in the minimum load state upon the increase of output voltage Vo, the output of OP amplifier OP1 is decreased. Also, since the decreased output of OP amplifier OP1 via the amplifying section 40e is supplied to the base of second switching device Q2, a self-resistance of the second switching device Q2 is increased. Accordingly, the resistance of the resistor circuit obtained by combining second resistor R2, third resistor R3 and the second switching device Q2 is increased, and the range delayed in delay circuit 46a is increased. Therefore, as shown in FIG. 5D, predetermined delay time Dy is generated in third NAND gate 46 as shown in FIG. 5D, and the output of third NAND gate 46 is provided by being inverted from fourth NAND gate 48 as shown in FIG. 5E.

Therefore, delay time Dx of FIG. 5C is of delaying the rising time of the pulse signal, and delay time Dy of FIG. 5D is of delaying the falling time of the pulse signal. Thus, the rising time and falling time of output GS1 of booster control section 40 supplied to booster section 32 become controlled in the output signal of the comparator OP2 of control section 36.

Meantime, in a minimum load state once output voltage Vo is decreased, the output of the OP amplifier OP1 is increased. Since the increased output of first comparator OP1 via amplifying section 40e is applied to the base of second switching device Q2, it is greatly amplified in second switching device Q2 to decrease the resistance obtained by combining of second resistor R2 and third resistor R3 and the second switching device Q2. In turn, the range delayed in delay circuit 46a provided to the input of third NAND gate 46 is decreased to thus reduce predetermined delay time Dy, so that the voltage applied to bulk condenser Cb is increased.

Additionally, the output of second NAND gate 44 becomes one input, and the output of second NAND gate 44 is combined and delayed by second resistor R2 and third resistor R3 in accordance with the switching of second switching device Q2 to be supplied as the other input of third NAND gate 46. Then, the output of third NAND gate 46 is provided via fourth NAND gate 48 being the buffer to switch first switching device S1 of booster section 32.

First NAND gate 42, second NAND gate 44, third NAND gate 46 and fourth NAND gate 48 constituting booster control section 40 are one preferred embodiment of being used as the integrated circuit. In this circuit construction, even if the circuit is constituted by second NAND gate 44 and third NAND gate 46, i.e., even if first NAND gate 42 and fourth NAND gate 48 is omitted, the signal is delayed without being inverted to have almost the same delay effect.

Contrarily to the case of maximum input voltage and minimum load as shown in FIG. 6A, a case that the input voltage is the minimum input and the load is in the maximum load state as shown in FIG. 6B will be briefly described. As the voltage applied to bulk condenser Cb is decreased, the loss of first switching device S1 is increased to require the minimum voltage of bulk condenser Cb for obtaining the optimum power factor. Therefore, for obtaining the optimum power factor by constantly maintaining the voltage of bulk condenser Cb, the decrease of the voltage of bulk condenser Cb due to the increase of the load should be prevented as the waveforms of the minimum input voltage and maximum load state shown in FIG. 6B.

That is, in order to increase the voltage of bulk condenser Cb by the switching of first switching device S1, delay section 40 controls to operate first switch section S1 by delaying the turn-on time thereof for predetermined delay time Dy.

A reference numeral $D_B$ shown in FIG. 6B denotes a duty of first switching device S1; and $D_F$, a duty of switch section S. Here, the duty of first switching device S1 and that of switch section S are determined by coil L1 and respective switching frequencies of first and second switching devices S1 and S2.

In other words, since input voltage Vi applied upon bulk condenser Cb is provided by the DC-type pulse for a short time period by the switching of booster section 32, it is represented as the DC voltage, i.e., voltage $V_{DC}$, and the equation employed for obtaining the duty of first switching device S1 and that of switch section S is written as follows for reference.

Voltage $V_{DC}$ applied upon bulk condenser Cb is obtained as the following equation by the energy balance condition:

$$V_{DC} = \frac{2\sqrt{2}}{\pi} V_s + \eta_B \eta_F \frac{V_S^2 D_B^2 V_{DC}}{2L l f l_o V_o} \tag{1}$$

where reference symbol Vs denotes the input voltage [Vrms]; $D_B$ is the duty of first switching device S1; $I_O$ is load current; $V_O$ is output voltage; L1 is the coil; f is the switching frequency; $\eta_B$ is the efficiency of booster section 32; and $\eta_F$ is the efficiency of the DC—DC converter at the succeeding stage of booster section 32.

Also, it should be designed to have the minimum input voltage and maximum load state so as to efficiently operate the converter regardless of the variation of input voltage Vi and load, and duty $D_B$ of first switching device S1 is set for satisfying the following equation so as to be operated for improving the power factor in the input voltage.

$$\frac{V_{DC}}{V_{DC} - \sqrt{2} V_s} \leq \frac{1}{D_B} \qquad (2)$$

Meantime, duty $D_F$ of switch section S can be defined by:

$$D_F = nV_O/V_i$$

where reference symbol Vi denotes the input voltage; $V_O$ is output voltage; n is the number of turns of the primary coil side when the number of turns of the secondary coil side of the transformer section is set by one.

In the PFC converter according to the present invention as described above in detail, the booster control section operated as the delay circuit is furnished to perform the switching in the booster section by enlarging the duty of the signal supplied to the gate of the switching device of the booster section from the booster control section for applying the increased voltage to the bulk condenser when the voltage applied to the bulk condenser is decreased in accordance with the voltage charging up the bulk condenser, i.e., in accordance with the increase of the voltage used for the load, so that the range of the stable voltage of the bulk condenser is constantly maintained. By doing so, the stable voltage is applied to the transformer section. As the other case, when the voltage applied upon the bulk condenser is increased due to the decrease of the voltage used for the load, the switching is performed by making the duty of the signal supplied to the gate of the switching device of the booster section be reduced to apply the decreased voltage to the bulk condenser. Thus, the harmonic current is decreased to constantly maintain the range of the stable voltage of the bulk condenser, so that the stable voltage is applied to the transformer section to be effective in improving the power factor of the converter.

Furthermore, although the converter is formed by the two stage PFC by the booster section and switch section, it is operated as the single stage PFC converter such that the booster section is controlled by the delayed output signal generated from the booster control section to apply the stable voltage to the transformer section, and the booster section and switch section are controlled by the single stage by the booster control section that is interrelated with the output of the control section. For these reasons, the power factor is significantly improved over that of the conventional technique. In addition to these, it is constructed to have the effect of the two stage control via the single stage control without employing the device for two stage control, thereby affording an effect of improving the productivity.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A PFC converter comprising:
   a booster section for switching an output of a bridge diode section for rectifying an input voltage for generating a stable output voltage;
   a switch section for switching the output of said booster section to a primary coil side of a transformer section;
   an output section for rectifying and smoothing an output of a secondary coil side of said transformer section;
   a control section for sensing an output voltage of said output section and performing a feedback operation of a sensing signal to said switch section to control an output of said output section;
   a booster control section having a first means for increasing a high level interval of an output pulse of a comparator in the control section by a preset time period and a second means for variably decreasing the high level interval of the output pulse in the first means within a range of a preset time period, and operating power factor to be improved by maintaining said output of said booster section uniformly,
   wherein said first means comprises a first buffer section including a first NAND gate for inverting the pulse of the comparator in the control section; and a second buffer section including a first delay section for delaying the output pulse of the first buffer section for a predetermined time period and outputting a resultant value, and a second NAND gate for NANDing an output pulse of the first delay section and the output pulse of the first buffer section, and
   the second means comprises an amplifying section for amplifying an output signal of an OP amplifier of the control section; a third buffer section including a second delay section for variably delaying the output pulse of the second buffer section in accordance with the output signal of the amplifying section, and a third NAND gate for NANDing the output pulse of the second delay section and the output pulse of the second buffer section; and a fourth buffer section including a fourth NAND gate for inverting the output pulse of the third buffer section.

2. A PFC converter in accordance with claim 1, wherein the first delay section comprises:
   a first resistance connected between an output terminal of the second buffer section ad an input terminal of the second NAND gate; and
   a first condenser having an end thereof connected to a common node of the first resistance and the second NAND gate and another end thereof connected to ground.

3. A PFC converter in accordance with claim 1, wherein the second delay section comprises:
   a second resistance connected between an output terminal of the second NAND gate and an input terminal of the third NAND gate;
   a third resistance having an end thereof connected to a common node of the output terminal of the second NAND gate and the second resistance;
   a second switching device having a collector connected to another end of the third resistance, a base connected to an output terminal of the amplifying section, and an emitter connected to a common node of the second resistance and the second switching device; and
   a second condenser having an end thereof connected to a common node of the emitter of the second switching device and the third NAND gate, and another end thereof connected to ground.

* * * * *